| United States Patent [19] | [11] Patent Number: 4,884,971 |
|---|---|
| Chan et al. | [45] Date of Patent: Dec. 5, 1989 |

[54] ELEVATION INTERPOLATOR FOR SIMULATED RADAR DISPLAY SYSTEM

[75] Inventors: Luen C. Chan, Boonton, N.J.; Jay P. Menozzi, Altamonte Springs, Fla.

[73] Assignee: Harris Corporation, Melbourne, Fla.

[21] Appl. No.: 73,084

[22] Filed: Jul. 14, 1988

[51] Int. Cl.$^4$ .............................................. G09B 9/00
[52] U.S. Cl. ...................................... 434/2; 340/995; 340/728
[58] Field of Search ............................ 434/2, 3, 4, 5; 340/990, 995, 728

[56] References Cited

U.S. PATENT DOCUMENTS

| | | | |
|---|---|---|---|
| 3,769,442 | 10/1973 | Heartz et al. | 434/2 |
| 3,801,720 | 4/1974 | Rymer | 434/2 |
| 3,883,861 | 5/1975 | Heartz | 434/2 |
| 4,017,985 | 4/1977 | Heartz | 434/2 |
| 4,085,524 | 4/1978 | Meyer | 434/2 |
| 4,168,582 | 9/1979 | Heidrich | 434/2 |
| 4,198,762 | 4/1980 | Lamasney et al. | 434/2 |
| 4,204,342 | 5/1980 | Linfield | 434/2 |
| 4,414,643 | 11/1983 | Meyer | 364/900 |
| 4,421,484 | 12/1983 | Wakeling et al. | 434/3 |
| 4,520,506 | 5/1985 | Chan et al. | 382/56 |
| 4,525,717 | 6/1985 | Wildermuth et al. | 434/3 X |
| 4,667,199 | 5/1987 | Roberts | 342/169 |
| 4,702,698 | 10/1987 | Beckwith et al. | 434/2 |
| 4,729,127 | 3/1988 | Chan et al. | 382/56 |

*Primary Examiner*—Thomas H. Tarcza
*Assistant Examiner*—John B. Sotomayor
*Attorney, Agent, or Firm*—Antonelli, Terry & Wands

[57] ABSTRACT

A signal processing mechanism for interpolating elevation data values between successive data points of a terrain map from which a simulated radar return image may be produced employs a signal processing operator in accordance with which input data signals representative of the elevations at successive data points on the terrain map are processed, to derive a continuous interpolated (terrain map) functional characteristic. Interpolated elevation data values at one or more points between successive ones of the original data points are calculated by employing elevation values for successive data points adjacent to those data points between which the one or more additional points of interest are located. The elevations of these additional 'intermediate' data points are derived using a polynomial the coefficients of which are determined in accordance with the harmonic mean, such that the magnitude of each of the elevations of the original terrain map is preserved, the slope of the interpolated terrain map characteristic at the original data points is continuous, and such that the sign of the slope of the interpolated terrain map characteristic between original data points does not change. Signal processing circuitry for executing the signal processing operator includes a coefficient calculation unit, a polynomial calculation unit and an elevation value buffer unit, the operation of each of which is processor-controlled.

21 Claims, 6 Drawing Sheets

ELEVATION INTERPOLATOR FOR SIMULATED RADAR DISPLAY SYSTEM

FIELD OF THE INVENTION

The present invention relates in general to information/display processing systems and, more particularly, to a system for monotonically interpolating terrain elevations at locations between points, lying within a map of elevation characteristics, at which points elevation data values are known.

BACKGROUND OF THE INVENTION

Improvements in digital signal processing of terrain data, particularly data compression, storage, retrieval and reconstruction, have resulted in the development of dynamic display mechanisms which provide an aircraft pilot/observer with a simulated display (e.g. moving map or radar) of terrain over which an aircraft is flying or is simulated to be flying in accordance with stored digital data and flight path inputs from the aircraft's navigation system. For example, in copending U.S. patent application Ser. No. 168,437 filed March 15, 1988, which is a continuation of Ser. No. 641,179, filed Aug. 15, 1986, now abandoned which is a continuation of application of Ser. No. 224,742 filed January 13, 1981, now abandoned, by Paul B. Beckwith Jr. et al, entitled "Digital Map Generator and Display System", and assigned to the assignee of the present application, there is described a system for effecting the dynamic display of terrain data, which is compressed and stored in digital form and which may be selectively and controllably accessed from memory and viewed on a cockpit cathode ray tube display in the form of a moving map of the terrain over which the aircraft is flying (or is simulated to be flying). Similarly, in copending U.S. patent application Ser. No. 652,875, filed Sept. 21, 1984, by Paul B. Beckwith Jr. et al, entitled "Digital Radar Generator", now U.S. Pat. No. 4,702,698, issued October 27, 1987 also assigned to the assignee of the present application, there is described a video display system for generating a simulated radar image corresponding to a prescribed radar sweep pattern directed toward the terrain from a designated radar source reference point about a preselected look angle. Like the moving map system, the digital radar display simulator processes stored digital data representative of elevations of terrain over a grid or matrix of geographical map entries.

In systems of the type described in the above-identified applications, because of size, weight and cost constraints, the capacity of the elevation data terrain map storage medium (e.g. magnetic disk), is limited, thereby restricting the resolution of the image to be produced from such a data base, without the use of a mechanism that effectively decreases the spacing between data points from that in the original data base (typically on the order of 100 meter intervals as provided by the Defense Map Agency). This limited capacity of the terrain map storage medium can be tolerated by using either some form of compression/decompression algorithm (e.g. discrete cosine transform) through which the data is subjected to upstream processing prior to storage and then again upon retrieval from the storage medium, or an interpolation mechanism through which additional elevation data values for map locations between known data values map be derived and thereby provide an enhanced, cockpit quality image.

Now, although a compression/decompression scheme permits the storage of an increased volume of data within a given data base capacity, its use adds to system complexity and cost prior to the signal processing that is to be carried out by the image processor. In addition, a particular compression/decompression scheme in and of itself may or may not increase resolution; if not, there still needs to be a mechanism for estimating data values between known locations. In the past, interpolation of elevation data values for points lying between successive known data values of a stored terrain map has been accomplished through an averaging or linear estimation process, typically based upon the data values of the successive known points. Examples of such interpolation schemes include linear or straight line connecting of successive elevation magnitudes and proportionately estimating data values of intermediate points, and through the use of a polynomial whose coefficients are derived using an arithmetic or geometric mean. For high precision imagery processing, such as high resolution radar returns, the above-referenced conventional signal processing methodologies have been found to be unsatisfactory; they either corrupt the original data, or they produce estimated data values that introduce imagery effects that would not otherwise appear in the contour of the original terrain.

More particularly, high precision imagery processing of (simulated) radar return data requires that both the elevation be maintained and the slope of the interpolated terrain be continuous at the original data points. In addition, the introduction of ripple or over(under)shoot into the interpolated contour between data points cannot be tolerated, since it would produce unreal shadows in the processed image. In other words, the contour of the interpolated radar image must be smooth and without a change in sign of the slope of the terrain between original data points.

SUMMARY OF THE INVENTION

In accordance with the present invention, there is provided a new and improved signal processing mechanism for interpolating elevation data values between successive data points of a terrain map from which a simulated radar return image may be produced. For this purpose the present invention employs a harmonic mean based signal processing operator in accordance with which input data signals representative of the elevations at successive data points on the terrain map are processed. Interpolated elevation data values at one or more points between successive ones of the original data points are calculated by employing elevation values for successive data points adjacent to those data points between which the one or more additional points of interest are located. The elevations of these additional 'intermediate' data points are derived using a polynomial, the coefficients of which are derived using a harmonic mean, such that the magnitude of each of the original elevations of the terrain map is preserved, the slope of the interpolated terrain map characteristic at the original data points is continuous, and such that the sign of the slope of the interpolated terrain map characteristic between original data points does not change.

Signal processing circuitry for deriving the interpolated characteristic includes a coefficient calculation unit, a polynomial calculation unit and an elevation value buffer unit, the operation of each of which is processor-controlled. The coefficient calculation unit processes input elevation data values to derive a set of coefficients associated with a third order polynomial. The independent variable is then applied to the interpolated polynomial in the polynomial calculation unit. The resultant interpolated elevation values are stored in output buffers and coupled over a feedback link for use by the coefficient calculation unit in the case where they are intermediate results, or to downstream (radar image) processing circuitry (e.g. scene memory for a CRT display) in the case where they are final results.

DETAILED DESCRIPTION

Before describing in detail the particular improved elevation interpolator system in accordance with the present invention, it should be observed that the present invention resides primarily in a novel structural combination of conventional data/signal processing circuits and components and not in the particular detailed configurations thereof. Accordingly, the structure, control and arrangement of these circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 1:
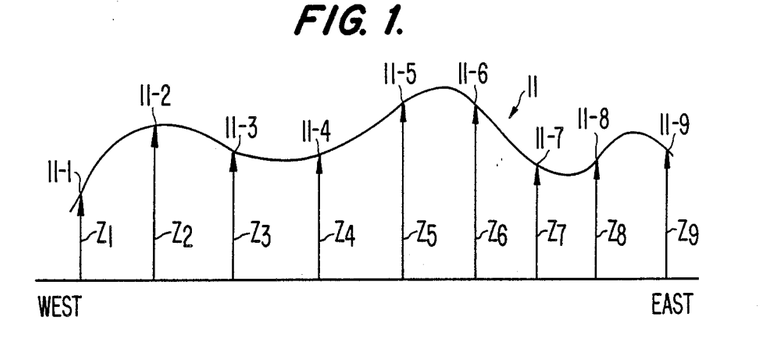
FIG. 1 is a diagrammatical illustration of a functional characteristic, sampled at successive data points, between which characteristic values are to be interpolated.

To facilitate an understanding of the present invention it is initially useful to examine a functional characteristic, such as the characteristic 11 diagrammatically shown in FIG. 1, that has been sampled at successive locations or data points 11-1 . . . 11-n to obtain a plurality of data values indicated by arrows $Z_1 \ldots Z_n$, representative of the magnitude of the characteristic thereat. For purposes of the present description, characteristic 11 may be understood to represent a portion of a West-to-East (two-dimensional) section of a three dimensional terrain map of elevation data, such as one based upon the Defense Map Agency data base, digitized samples for which are provided at 100 meter intervals. It should be understood that the sampling interval may vary and, in fact, may be considerably narrower than the 100 meter interval of the present illustration. (A typical DMA map data point interval may be on the order of 12.5 meters.) The relatively large separation between data points chosen here is to illustrate the practical resolution to which such a data base may be constrained, in order to store the data in a small volume, low weight, aircraft type environment. Such a limited resolution of the stored data, however, limits the ability of an image generator, such as a simulated radar return image generator described in the application referenced above, to produce a high resolution, cockpit quality picture. Consequently, it is necessary to interpolate additional elevation data values between the (100 meter) spacing provided by the original data base.

As mentioned briefly above, in the course of the generation of the interpolated elevation data, it is of paramount importance that the interpolated values not only not corrupt the original data, but their slope must be continuous and they must not introduce ripples or over(under)shoot into the resultant map characteristic, in order that the image on the radar screen will not contain unreal shadows and discontinuities that may deceive the pilot/observer. These requirements are achieved in accordance with the present invention through the use of an interpolating polynomial characteristic that is used to define the elevations at a plurality of intermediate points on the terrain map between each of the given data points based upon the elevation values of multiple data points to either side of an intermediate point of interest. Because the coefficients of the interpolating polynomial are derived using a harmonic mean, the magnitude of each of the original elevations of the terrain map is preserved, the slope of the polynomial at the original data points is continuous, and the sign of the slope of the polynomial between original data points does not change.

The impact of the interpolation system in accordance with the present invention, to be described below in terms of its functional components, on the original terrain map data diagrammatically illustrated in FIG. 1, may be understood by reference to FIG. 2, which shows the elevation data values $Z_1 \ldots Z_n$ sampled from the functional characteristic 11, together with a series of line segments S12, S23, S34, . . . , Sn-1, Sn, representative of the incline or slope between successive data points. As shown therein, line segment S12, which points from data point 11-1 to data point 11-2, is inclined or sloped upwardly in an easterly direction, indicating that the magnitude of the elevation of the terrain at data point 11-2 is greater than that at data point 11-1. Similarly, line segment S23, which points from data point 11-2 to data point 11-3, is inclined or sloped downwardly in an eastwardly direction, indicating that the magnitude of the elevation of the terrain at data point 11-3 is less than that at data point 11-2. Line segments S34, S45, . . . show similar changes in elevation between subsequent, successive data points 11-3, 11-4, . . . In effect, therefore, the line segments S provide a key or reference that the slope of the contour of the resulting interpolated terrain map can be expected to follow if the interpolation criteria set forth above are to be satisifed.

More specifically, considering successive data points 11-1, 11-2, 11-3 and 11-4, for example, because the elevations at each of data points 11-1 and 11-3 are less than or equal to that at data point 11-2, then, in order for the contour of the interpolated terrain map characteristic at points between points 11-1 and 11-3 to have a monotonically increasing/decreasing slope, namely a slope having no change in sign between points 11-1 and 11-2 and between points 11-2 and 11-3 and for the slope to be continuous at point 11-2, it is necessary that the slope of the resultant map at data point 11-2 be zero. Similarly, since the elevation at data point 11-2 and 11-4 is greater than or equal to that at data point 11-3, then in order to provide a smooth, monotonic contour from data point 11-2 to data point 11-4, the slope of the map at data point 11-3 must be zero. These slope values are shown in FIG. 2 by tangential lines ST1, ST2, ST3, ... at the respective data points for elevation values Z1, Z2, Z3, . . .

Figure 2:
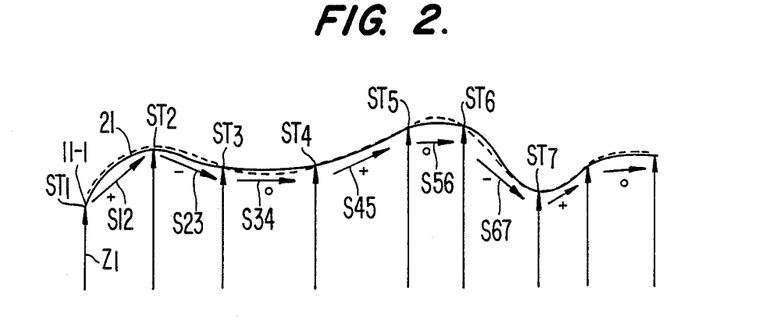
FIG. 2 shows elevation data values sampled from the functional characteristic of FIG. 1, together with a series of line segments representative of the incline between successive data.

Also shown in FIG. 2 are a series of broken line segments L12, L23, L34, . . . which interconnect the original data points 11-1, 11-2, 11-3, . . . and are tangent to the slope representative tangential lines ST1, ST2, ST3, ... thereat. Broken line segments L12, L23, L34, ... represent the interpolated terrain map characteristic that results from the interconnection of elevation values that have been interpolated at points in between the original data points through the use of a signal processor to be described below. As shown in FIG. 2, the resultant contour 21 preserves the magnitudes of the elevations at the original data points and has slopes continuous at those data points. Between these original data points the interpolated map contour is smooth and without overshoot or undershoot, so that the radar return image will not be distorted.

Figure 3:
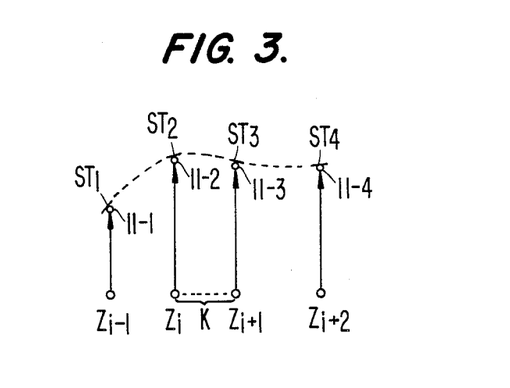
FIG. 3 depicts a set of elevation values at four arbitrary original data points lying along a line of a terrain map.

The manner in which the signal processing operator of the present invention interpolates elevation values at one or more points between successive ones of the original data points, such as the data points shown in FIGS. 1 and 2, may be understood by reference to FIG. 3, which depicts a set of elevation values $Z_{i-1,j}, Z_{i,j}, Z_{i+1,j}$ and $Z_{i+2,j}$ at four arbitrary original data points lying along a line, such as a West-to-East grid line j of the original terrain map, at locations $i-1$, $i$, $i+1$ and $i+2$. Pursuant to the present invention the interpolation process to be described below is carried out for a single dimension of the data base and then replicated in an orthogonal dimension using the interpolated points of the first dimension as though they were original data values.

Also shown in FIG. 3 between original data points i,j and i+1,j is a plurality of k points at which elevation values are to be interpolated in accordance with the signal processing operator. The number k is chosen in accordance with a desired interpolation ratio, corresponding to the total number of data points after interpolation relative to the total number of data points prior to interpolation. Typical, but non-limitative, values of the interpolation ratio are 2:1, 4:1, 8:1, 16:1, 32:1, etc. In the illustration of FIG. 3, the interpolation ratio chosen is 8:1, so that there are k=7 data points between original data points (only the points between data points i,j and i+1,j being shown so as to simplify the drawing).

As pointed out above, the interpolation mechanism employs a signal processing operator which, after the interpolation process, maintains the integrity of the original elevation data values with the slope of the terrain being continuous at the original data points. Namely, for any data point i,j, its elevation value Z(i,j) after interpolation is equal to its elevation value $Z_{i,j}$ prior to interpolation. Similarly, the slope $Z'(i,j)$ thereat after interpolation is equal to the slope $Z'_{i,j}$ before interpolation, as defined by the harmonic mean operator. Consequently, the sign of the slope of the resultant interpolated terrain map between data points does not change.

For this purpose a third order polynomial expression set forth below is employed to define the elevation value at a respective interpolated data point between original data points. For the k data points between original data points i,j and i+1,j shown in FIG. 3, the interpolated elevation Z(i+x,j) at any data point p within the plurality k between points i,j and i+1,j is defined by the expression:

$$Z(i+x,j) = a_{i,j} + b_{i,j}x + c_{i,j}x^2 + d_{i,j}x^3$$

where:

$x = p/(k+1)$; $p = (0, 1, \ldots, k)$.

Similarly, in the orthogonal direction (North-South), the expression for the interpolated elevation value $Z(i,j+y)$ at any interpolated data point p may be defined by the expression:

$$Z(i,j+y) = a_{i,j} b_{i,j}y + c_{i,j}y^2 + d_{i,j}y^3$$

where:

$y = p/(k+1)$; $p = (0, 1, \ldots, k)$.

The coefficients in the above equations are defined in accordance with a harmonic mean operator, H, which is a function of the forward and backward differences, D, from an original elevation point Z. More specifically, the coefficients of the polynomial for interpolating k points between original elevation points $Z_i$ and $Z_{i+1}$ are a function of $H_i$ and $H_{i+1}$, which are a function of forward and backward differences $D_i$ and $D_{i-1}$ from point $Z_i$ and forward and backward differences $D_{i+1}$ and $D_i$ from point $Z_{i+1}$, respectively. $H_i$ is defined by:

$$H_i = (2D_i D_{i-1})/(D_i + D_{i-1}); \quad D_i D_{i-1} > 0$$
$$= 0; \quad D_i D_{i-1} \leq 0,$$

while $D_i$ is defined by:

$$D_i = Z_{i+1} - Z_i$$

The coefficients $a_i$, $b_i$, $c_i$ and $d_i$ in the polynomial equations are defined as:

$$a_i = Z_i$$
$$b_i = H_i$$
$$c_i = H_{i+1} + 2H_i - 3D_i$$
$$d_i = H_{i+1} + H_i - 2D_i.$$

As pointed out above, the interpolation process employing the above defined polynomial signal processing operator is carried out for a single dimension of the data base and then replicated in an orthogonal dimension using the interpolated points of the first dimension as though they were original data values. In terms of the size of the terrain map data base, the hardware which implements the interpolation mechanism operates over some prescribed number of data points which depends upon the interpolation ratio (e.g. 8:1) and the desired number of resultant interpolated points and therefore the area of the terrain map effected will vary in accordance with this ratio. As will be explained hereinafter, for any given interpolation ratio, if the desired size of the resultant interpolated block of points is $(128)^2$, then the size of the block of data points over which the hardware implements the interpolation mechanism must be equal to $M^2$, where $M = 128/(k+1) + 3$.

Referring again to FIG. 3, and letting subscript $i=0$, a set of $(k+1) = 8$ elevation values are derived from the four input points $i-1 \ldots i+2$ shown and associated with $Z_0$ (including $Z_0$ itself and $k=7$ interpolated points). By shifting through successive data points $Z_3$, $Z_4, \ldots$, additional sets of points (in neighborhoods of four original data points) are processed. Thus, for the set of points shown in FIG. 3, seven elevation values are interpolated between data points $Z_0$ and $Z_1$. Shifting to the right or eastward direction, would present a new set of data points $Z_0 \ldots Z_3$ with the interpolated elevation values being determined between data points $Z_1$ and $Z_2$. This iterative process is repeated until a complete row or west-to-east line of 128 points have been produced. Since eight points are generated during each iteration, a total of sixteen iterations yields the 128 elevation values. In addition to each iteration requiring the next Z value (e.g. the iteration for data point $i+1$ requires $Z_{i+3}$), the first set of a line, based on $Z_0$, requires the use of $Z_{-1}$, and the last set, based on $Z_{15}$, requires the use of $Z_{16}$ and $Z_{17}$, yielding a need for sixteen base points plus three extra points, or a total of nineteen points.

Upon completion of the first row of 128 points, the process proceeds to the next row $j+1$ and begins again at point $i=0$, as described above. Row $j+1$ and each succeeding row is processed in the same manner as the first row until interpolated elevation values have been obtained for rows $j \ldots j+15$, as noted above. In addition, since the jth row requires the use of the $(j-1)$th row and the $(j+15)$th row requires the use of rows $j=16$ and $j=17$, the process is carried out for a total of nineteen rows. In other words, interpolation of a block of $128 \times 128$ data points requires the use of a $19 \times 19$ matrix of original data points, corresponding to the above referenced $M^2$, where $M = 128/(k+1) + 3$.

Figure 4:
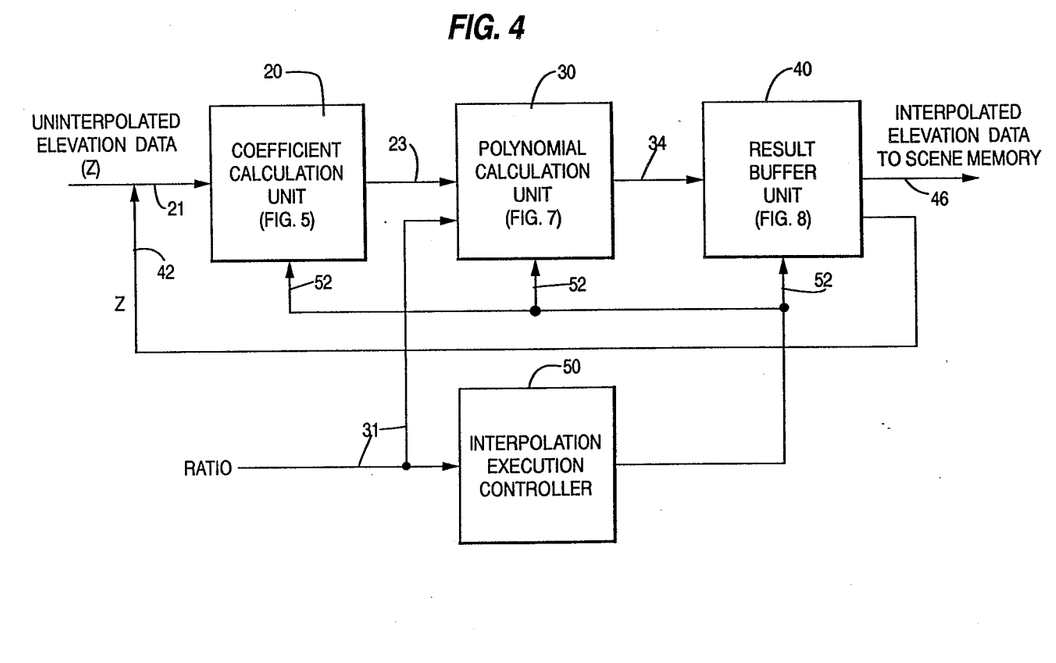
FIG. 4 shows a functional block diagram of the hardware to be employed for implementing the interpolation mechanism of the present invention.

Referring now to FIG. 4 there is shown a functional block diagram of the hardware to be employed for implementing the interpolation mechanism described above. As shown therein, the interpolator comprises three principal signal processing units: a coefficient calculation unit 20, a polynomial calculation unit 30 and a result buffer unit 40, the operation of each of which is controlled by a microprocessor-based interpolation execution controller 50.

Coefficient calculation unit 20 (to be described in detail below with reference to FIG. 5) is coupled to an input link 21 over which the original uninterpolated elevation data is supplied from an upstream data source (not shown). When enabled via link 52 from execution controller 50, coefficient calculation unit 20 processes the input elevation data values to obtain the coefficients a, b, c and d to be employed in the course of execution of the third order polynominal expressions through which the interpolated elevation values are derived.

The coefficients produced by unit 20 are coupled over link 23 to polynomial calculation unit 30 (to be described below with reference to FIG. 7), wherein they are combined with an externally defined interpolation ratio supplied over link 31, to obtain the interpolated elevation values $Z(i+x,j)$ and $Z(i,j+y)$ at the interpolated data points. Like unit 20, polynomial calculation unit 30 is controlled via link 52 from interpolation execution controller 50.

The resulting interpolated elevation values are coupled over link 34 to result buffer unit 40 (to be described below with reference to FIG. 8), which contains an intermediate buffer and a final ping-pong buffer in which the elevation values may be stored, depending upon whether the data values are intermediate or final results, under the control of execution controller 50. If the calculated values are intermediate results they are stored in an intermediate buffer and fed back via link 42 to coefficient calculation unit 20. If the calculated values are final results they are stored in one of a pair of ping-pong buffers before being forwarded over link 46 to downstream radar processing circuitry, such as the scene memory employed in the system described in the above referenced copending application. If no interpolation is required, elevation data values for original data points bypass the polynomial calculation process and stored directly in the final ping-pong buffer.

Interpolation execution controller 50 is comprised of a firmware-driven microprocessor-based control unit, which controls the sequence of events, including data transfer and calculations, through which the interpolation process is carried out. For this purpose, controller 50 is comprised of a microprocessor and attendant memory for storing an operations control program through which the sequencing of elevation data through the interpolation process carried out by units 20, 30 and 40 is controlled. Rather than provide a detailed description of the microprocessor and memory components of which controller 50 is configured, a level of detail which is unnecessary for an understanding of the present invention, the explanation to follow will describe the interpolation execution control firmware through which controller supervises the flow and manipulation of data through the system in terms of the operation of the individual units 20, 30, and 40.

Figure 5:
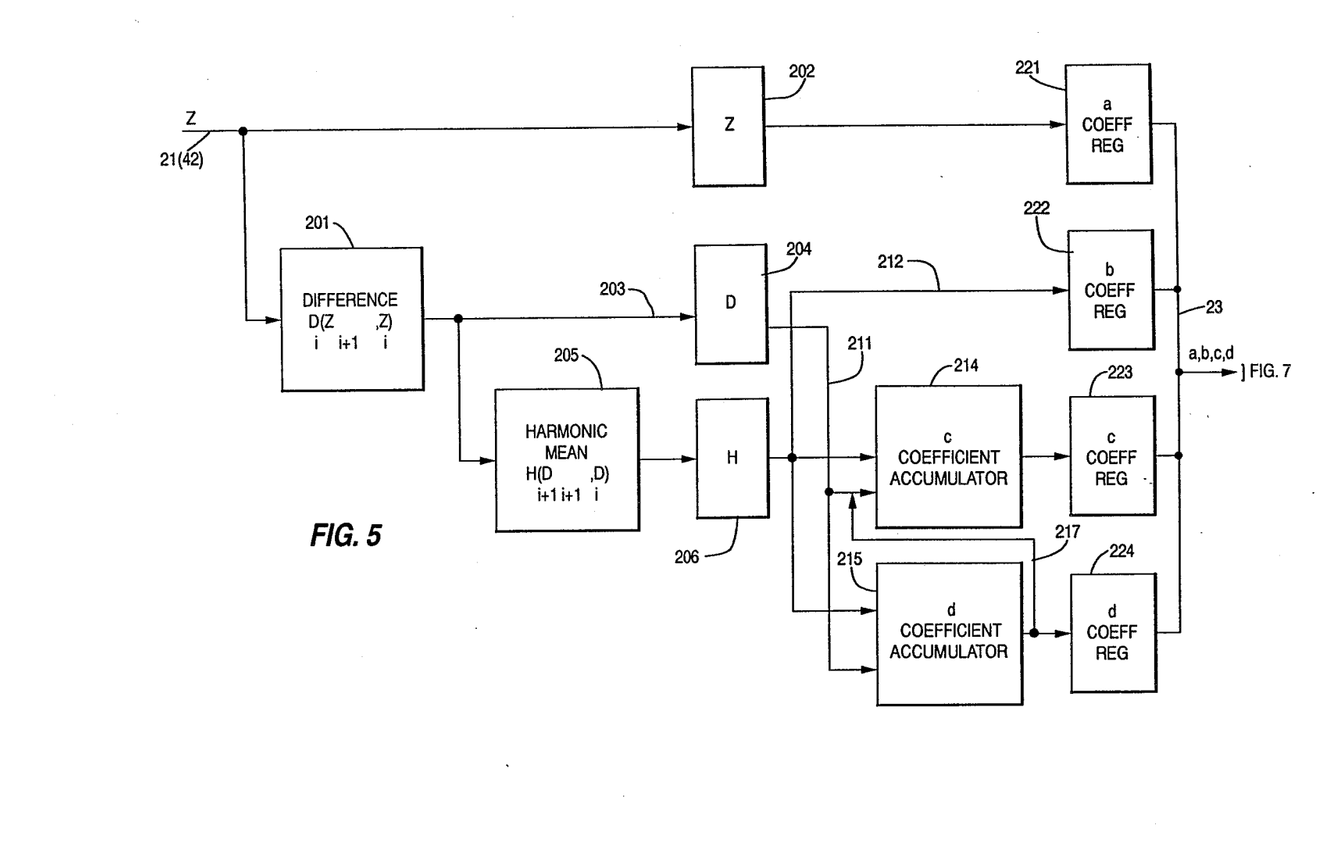
FIG. 5 shows the configuration of a coefficient calculation unit.

Referring now to FIG. 5, the configuration of coefficient calculation unit 20 is shown as comprising a set of signal processing components the functionality and arrangement of which is modified somewhat with respect to the expressions for the coefficients set forth above, in order to provide a more efficient implementation of the invention. In effect, the configuration shown in FIG. 5 solves the coefficient equations by rearranging the equations in the manner to be described below. In terms of the actual hardware employed, the components of the configuration of the coefficient calculation unit shown in FIG. 5, as well as those employed in the configurations of the other portions of the system diagram of FIG. 4, are comprised of conventional digital signal processing circuits, including dedicated arithmetic logic circuits and programmable read only memories.

To facilitate an understanding of the implementation shown in FIG. 5, the expressions for the coefficients may be rewritten as:

$$a_i = Z_i$$
$$b_i = H_i$$
$$d_i = H_i - 2D_i + H_{i+1}$$
$$-c_i = H_i - D_i + d_i$$

where Z, D and H are defined as set forth above.

Figure 6:
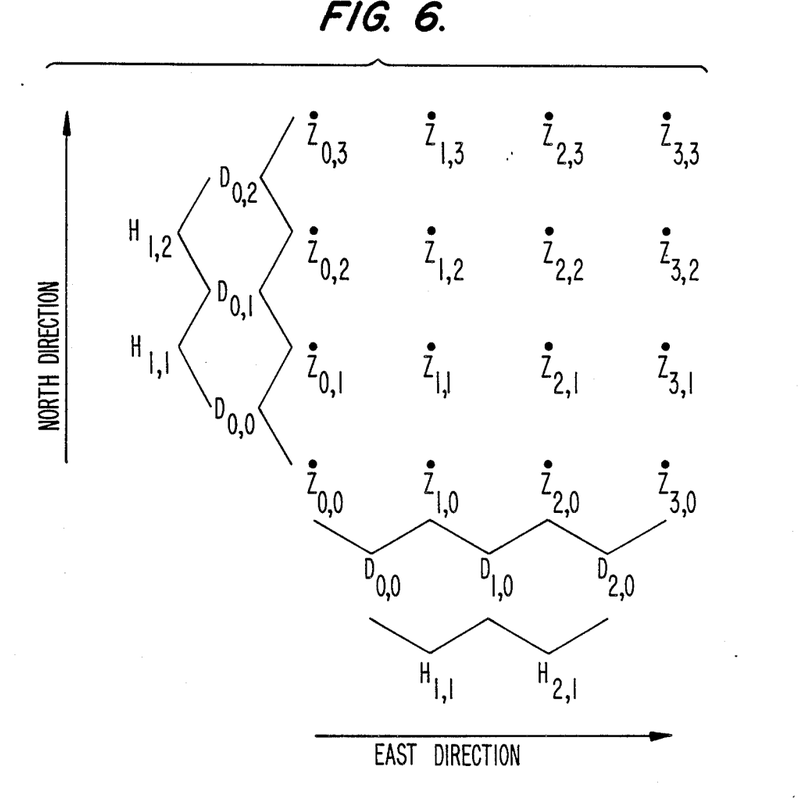
FIG. 6 shows the relationship among elevation Z, elevation differential D and harmonic mean H terms for a four-by-four matrix of data points.

From the equations it can be seen that each of the set of four coefficients $(a_i, b_i, c_i$ and $d_i)$ is derived as a function of four data points: $Z_{i-1}, Z_i, Z_{i+1}$ and $Z_{i+2}$. These four points are used to generate three difference values: $(D_{i+1}=Z_{i+2}-Z_{i+1})$, $(D_i=Z_{i+1}-Z_i)$ and $(D_{i-1}=Z_i-Z_{i-1})$ which, in turn, are used to calculate two harmonic mean terms: $H_{i+1}(D_{i+1},D_i)$ and $H_i(D_i,D_{i-1})$. For a four-by-four matrix of data points $i=0,j=0 \ldots i=3,j=3$, the relationship among the elevation Z, elevation differential D and harmonic mean H terms, may be illustrated as shown in FIG. 6.

Referring again to FIG. 5, input link 21 (42) over which elevation data values are supplied is coupled to a difference calculation circuit 201 and to an elevation data value pipeline register 202. Difference calculation circuit 201 calculates the difference $D_i$ between successive elevation data values and supplies an output over link 203 to a differential pipeline register 204 and to harmonic mean calculation circuit 205, which calculates the value $H_i$ in accordance with the above expression. The output of harmonic mean calculation circuit 205 is stored in pipeline register 206. From the above set of coefficient equations it can be seen that coefficients a and b come directly from pipeline registers 202 and 204, respectively. The harmonic mean (H) and differential (D) values are further processed through a pair of coefficient accumulators to drive the c and d coefficients.

Figure 7:
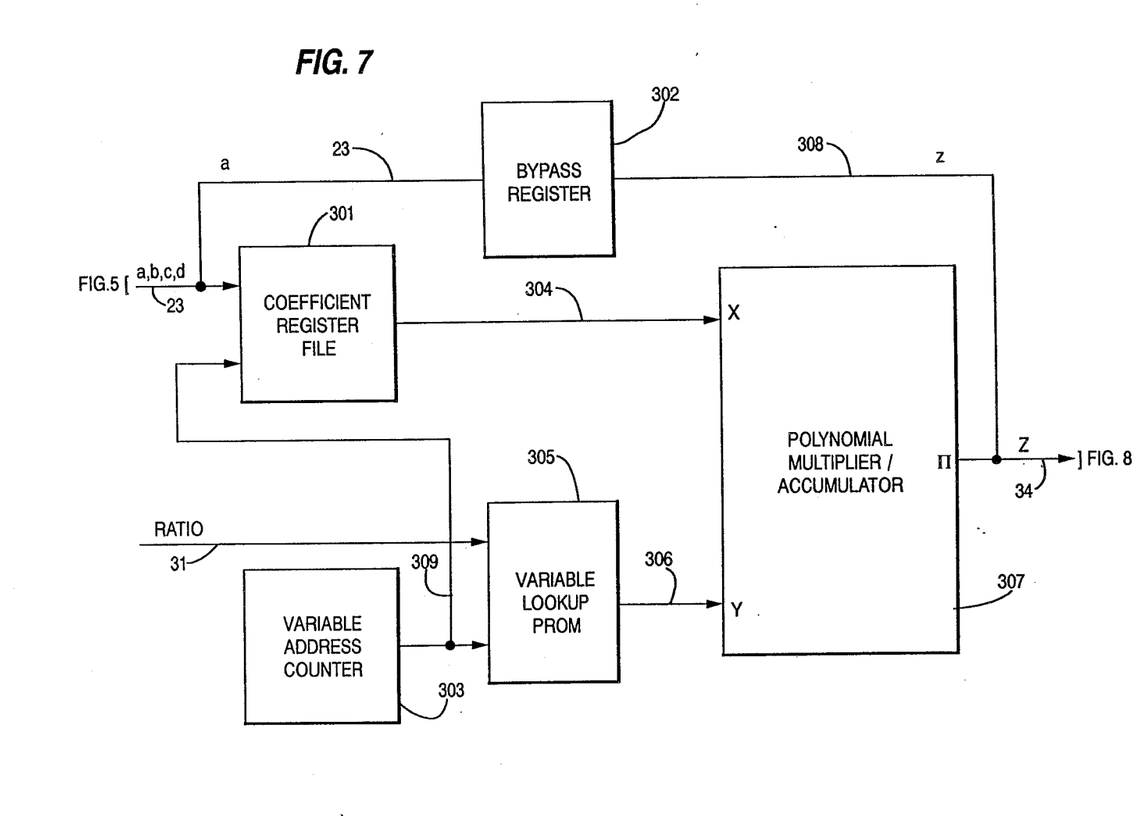
FIG. 7 shows the configuration of a polynomial calculation unit.

For this purpose, the elevation differential value D stored in pipeline register 204 is coupled over link 211 as one input of a d coefficient accumulator 215. A second input of accumulator 215 is supplied over link 212 from the output of harmonic mean pipeline register 206. Links 211 and 212 are also coupled to respective inputs of a c coefficient accumulator 214. In addition, the output of d coefficient accumulator is coupled over link 217 to c coefficient accumulator 214 to be combined with the harmonic mean and elevation differential values supplied by pipeline registers 206 and 204, respectively. Each of the coefficient values a, b, c, and d is stored in a respective coefficient register 221, 222, 223 and 224, for application over link 23 to downstream polynomial calculation circuit 30, the configuration of which is shown in FIG. 7.

As shown therein, output link 23 from the coefficient output registers 221 . . . 224 of the coefficient calculation unit of FIG. 5 is coupled to one input of a coefficient register file 301 and a bypass register 302. Coefficient register file 301 is a four stage multibit pipeline register file in which the coefficients supplied over link 23 are buffered until used by a downstream polynomial multiplier/accumulator 307 in the course of the execution of the polynomial calculation. A second input of coefficient register file 301 is an address input coupled via link 309 to the output of a variable address counter 303. Variable address counter supplies a series of address codes to coefficient register file 301 to transfer the store coefficient values in the proper sequence to multiplier/accumulator 307.

Link 309 also forms part of the address inputs to a variable lookup PROM 305. Variable lookup PROM 305 stores the independent variable (x) of the interpolating polynomial and is addressed by the combination of a three bit code on ratio link 31 and an eight bit code supplied by an eight bit variable address counter 303 on link 309. The data value accessed from PROM 305 depends upon the interpolation ratio, the point within the current interpolation and the term within the polynomial. As pointed out above, the ratio itself indicates the number of points that each interpolation yields. For each ratio the independent variable (x) will have a different value based upon the relationship:

$x = p/(k + 1)$; where $p = (0,1,2,\ldots,k)$, and
$k =$ the number of points between data points.

Each point is computed in accordance with the third order polynomial expression set forth above, requiring four powers of the variable x as:

$$ax^0+bx^1+cx^2+dx^3.$$

During the calculation of each polynomial, the two least significant bits of the address are used to index the four powers of the variable x for that point. The next most significant bits of the PROM address inputs are used to index the specific point with the interpolation.

The variable values accessed form PROM 305 are coupled over link 306 to one of the multiplier inputs of polynomial multiplier/accumulator 307, to be combined with the respective coefficient value stored in coefficient register file 301 and then summed to yield the interpolated elevation values. In the event no interpolation is to be performed, original elevation data values (corresponding to the 'a' coefficients on link 23 and buffered in bypass register 302) are read out over link 308 to be passed on to result buffer unit 40.

Figure 8:
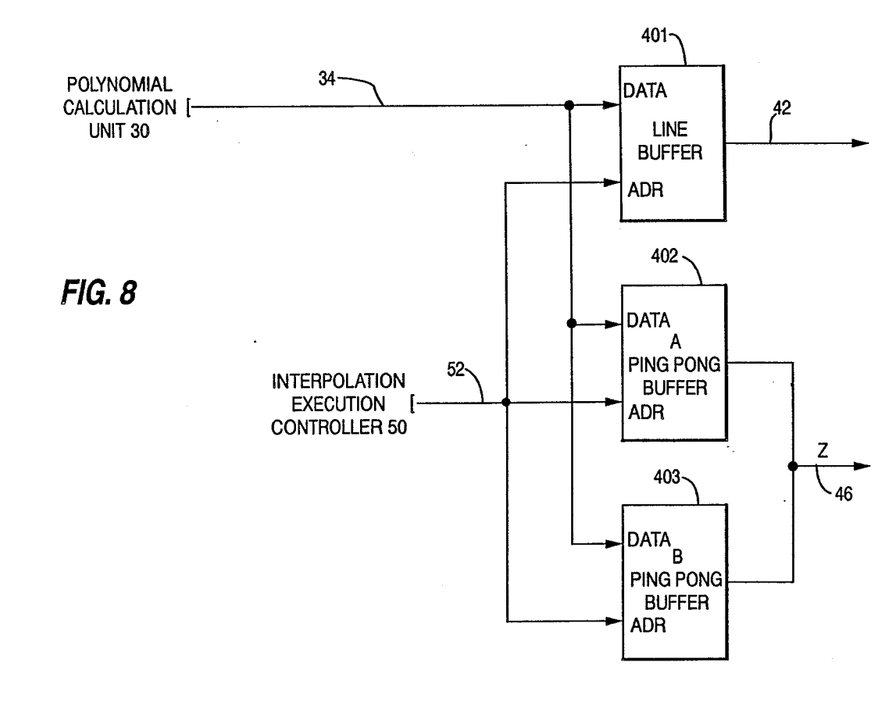
FIG. 8 shows the configuration of a result buffer unit.

Result buffer unit 40 is illustrated in FIG. 8 as comprising an intermediate buffer 401 and a pair of final ping-pong buffers 402 and 403, together with the data and control inputs therefor. Line buffer 401 is coupled to link 34 from polynomial calculation unit 30 for storing the intermediate results of the calculation process which it feeds back to coefficient calculation unit 20 via link 42, as pointed out above. Ping-pong buffers 402 and 403 are also coupled to link 34 for storing the final results of the interpolated process carried out by polynomial calculation unit 30. The outputs of the ping-pong buffers are coupled over link 46 to downstream radar processing circuitry, such as a scene memory of the type employed in the system described in the above referenced copending digital radar generator patent application. With the exception of read control for the ping-pong buffers, input/output control signals for controlling the entry and readout of data form buffers 401-403 are supplied by execution control unit 50. Read control signals for the ping-pong buffers are supplied by downstream processing circuitry which uses the interpolated elevation values, e.g. a scene memory.

As noted above, the interpolation process carried out by coefficient calculation unit 20 and polynomial calculation unit 30 is executed line-by-line in a first direction (e.g. west-east) and then repeated in a second, orthogonal direction (e.g. north-south) using the interpolated points of the first direction in the second calculation. For this purpose, intermediate results for the first direction are stored in line buffer 401 row-by-row and then read out column-by-column. During the respective interpolations the results are stored in alternate ones of the ping-pong buffers for transfer to downstream radar image processing circuitry (scene memory).

As will be appreciated from the foregoing description, the inaccuracies of conventional mechanisms for interpolating between data points of a sampled (terrain map) characteristic, such as averaging or linear estimation processes which may corrupt the original data, or produce estimated data values that introduce imagery effects that would not otherwise appear in the contour of the original terrain, are overcome by a new and improved interpolation mechanism for effecting high precision imagery processing of (simulated) radar return data which maintains the integrity of the elevation and has a continuous slope at the original data points. In addition, the introduction of ripple or over(under)shoot into the interpolated contour between data points does not occur, thereby avoiding the introduction of unreal shadows in the processed image. As a result of the interpolation process in accordance with the invention, the contour of the interpolated radar image is smooth and monotonic, namely, without a change in sign of the slope of the terrain between original data points.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a signal processing system in which a plurality of data signals representative of points on a prescribed functional characteristic are processed to derive an output signal function, a method of generating a continuous interpolated functional characteristic points on which include points on said prescribed functional characteristic and points lying between successive points on said prescribed functional characteristic comprising the steps of:
   (a) generating a signal processing operator in accordance with input data signals representative of successive points on said prescribed functional characteristic, said signal processing operator defining the value of said interpolated functional characteristic at at least one point between said successive points on said prescribed functional characteristic such that the magnitude of said prescribed functional characteristic at said successive points is preserved, the slope of said interpolated functional characteristic at said successive points is continuous, and such that the sign of the slope of said interpolated functional characteristic between said successive points does not change; and
   (b) applying plural input data signals to said signal processing operator and causing said signal processing operator to generate a plurality of output signals representative of interpolated values of said interpolated functional characteristic between said successive data points.

2. A method according to claim 1, wherein said signal processing operator contains a harmonic mean signal processing operator.

3. A method according to claim 1, wherein, for a respective one of said successive points on said prescribed functional characteristic, said signal processing operator defines the value of said interpolated functional characteristic thereat in accordance with input data signals of immediately successive points between which said respective point is located and in accordance with input data signals of additional points immediately adjacent to said immediately successive points.

4. A method according to claim 1, wherein, for a respective one of said successive points on said prescribed functional characteristic, said signal processing operator defines the value of said interpolated functional characteristic thereat in accordance with the difference between input data signals of immediately successive points between which said respective point is located and in accordance with the difference between input data signals of additional points immediately adjacent to said immediately successive points.

5. A method according to claim 1, wherein step (b) comprises generating an output data signal for a respective point on said interpolated functional characteristic in accordance with a polynomial expression in terms of the location of said respective point relative to one of said immediately successive points, said polynomial expression having coefficients defined in accordance with the harmonic mean of differences between input data signals at said immediately successive points and said immediately adjacent points.

6. A method according to claim 5, wherein said polynomial expression is a third order polynomial.

7. A method according to claim 1, wherein said signal processing operator defines the value Z at a respective point x on said interpolated functional characteristic in accordance with the expression:

$$Z(i+x) = a_i + b_i x + c_i x^2 + d_i x^3,$$

where x is located between successive data points i and i+1, and a, b, c and d are coefficients.

8. A method according to claim 1, wherein said interpolated functional characteristic is a three dimensional characteristic the value Z of which is definable in two orthogonal directions and wherein said signal processing operator defines the value Z at a respective point x on said interpolated functional characteristic in accordance with the expression:

$$Z(i+x,j) = a_{i,j} + b_{i,j} x + c_{i,j} x^2 + d_{i,j} x^3,$$

where x is located between successive data points i,j and i+1,j and a, b, c and d are coefficients.

9. A method according to claim 7, wherein the values of said coefficients a, b, c and d are defined by:

$$a_i = Z_i$$
$$b_i = H_i$$
$$d_i = H_i - 2D_i + H_{i+1}$$
$$-c_i = H_i - D_i + d_i$$

where:

$$D_i = Z_{i+1} - Z_i, \text{ and}$$

-continued $$H_{i+1} = 2D_i + 1D_i/(D_{i+1} + D_i) = 1/((1/2D_{i+1}) + (1/2D_i)) \quad ; D_{i+1} > 0$$
$$0 \quad ; D_{i+1}D_i \leq 0.$$

10. For use with a signal processing system in which a plurality of data signals representative of points on a prescribed functional characteristic are processed to derive an output signal function, an apparatus for generating a continuous interpolated functional characteristic points on which include points on said prescribed functional characteristic and points lying between successive points on said prescribed functional characteristic comprising:

signal processing means for defining the value of said interpolated functional characteristic, in accordance with input data signals representative of successive points on said prescribed functional characteristic, at at least one point between said successive points on said prescribed functional characteristic such that the magnitude of said prescribed functional characteristic at said successive points is preserved, the slope of said interpolated functional characteristic at said successive points is continuous, and such that the sign of the slope of said interpolated functional characteristic between said successive points does not change; and means for applying plural input data signals to said signal processing means and causing said signal processing means to generate a plurality of output signals representative of interpolated values of said interpolated functional characteristic between said successive data points.

11. An apparatus according to claim 10, wherein said signal processing means includes means for defining the value of said interpolated functional characteristic in accordance with a harmonic mean.

12. An apparatus according to claim 10, wherein, for a respective one of said successive points on said prescribed functional characteristic, said signal processing means defines the value of said interpolated functional characteristic thereat in accordance with input data signals of immediately successive points between which said respective point is located and in accordance with input data signals of additional points immediately adjacent to said immediately successive points.

13. An apparatus according to claim 10, wherein, for a respective one of said successive points on said prescribed functional characteristic, said signal processing means defines the value of said interpolated functional characteristic thereat in accordance with the difference between input data signals of immediately successive points between which said respective point is located and in accordance with the difference between input data signals of additional points immediately adjacent to said immediately successive points.

14. An apparatus according to claim 10, wherein said signal processing means comprises means for generating an output data signal for a respective point on said interpolated functional characteristic in accordance with a polynomial expression in terms of the location of said respective point relative to one of said immediately successive points, said polynomial expression having coefficients defined in accordance with the harmonic mean of differences between input data signals at said immediately successive points and said immediately adjacent points.

15. An apparatus according to claim 10, wherein said polynomial expression is a third order polynomial.

16. An apparatus according to claim 10, wherein said signal processing means defines the value Z at a respective point x on said interpolated functional characteristic in accordance with the expression:

$$Z(i+x) = a_i + b_i x + c_i x^2 + d_i x^3,$$

where x is located between successive data points $i$ and $i+1$, and a, b, c and d are coefficients.

17. An apparatus according to claim 10, wherein said interpolated functional characteristic is a three dimensional characteristic the value Z of which is definable in two orthogonal directions and wherein said signal processing operator defines the value Z at a respective point x on said interpolated functional characteristic in accordance with the expression:

$$Z(i+x,j) = a_{i,j} + b_{i,j} x + c_{i,j} x^2 + d_{i,j} x^3,$$

where x is located between successive data points i,j and i',j and a, b, c and d are coefficients.

18. An apparatus method according to claim 16, wherein the values of said coefficients a, b, c and d are defined by:

$$a_i = Z_i$$
$$b_i = H_i$$
$$d_i = H_i - 2D_i + H_{i+1}$$
$$-c_i = H_i - D_i + d_i$$

where:

$$D_i = Z_{i+1} - Z_i, \text{ and}$$

$$H_{i+1} = 2D_i + 1D_i/(D_{i+1} + D_i) = 1/((1/2D_{i+1}) + (1/2D_i)) \quad ; D_{i+1} > 0$$
$$0 \quad ; D_{i+1}D_i \leq 0.$$

19. For use with a signal processing system for processing radar return representative signals in which a plurality of data signals representative of elevations at points on a terrain map are processed to derive a radar return image display, an apparatus for generating a continuous interpolated terrain map characteristic for points on said terrain map lying between successive points for which elevation representative data signals are provided comprising, in combination:

signal processing means for defining interpolated elevation values for points on said terrain map, in accordance with input data signals representative of elevation values thereof at successive points thereon, at at least one point between successive points on said terrain map such that the original elevations of said terrain map at said successive points are preserved, the slope of said interpolated terrain map characteristic at said successive points is continuous, and such that the sign of the slope of said interpolated terrain map characteristic between said successive points does not change; and means for applying plural input data signals to said signal processing means and causing said signal processing means to generate a plurality of output signals representative of interpolated values of said interpolated terrain map characteristic between said successive data points.

20. An apparatus according to claim 19, wherein said signal processing means defines the elevation Z at a respective point x on said terrain map in accordance with the expression:

$$Z(i+x) = a_i + b_i x + c_i x^2 + d_i x^3,$$

where x is located between successive data points i and i+1, and a, b, c and d are coefficients.

21. An apparatus according to claim 20, wherein the values of said coefficients a, b, c and d are defined by:

$$\begin{aligned} a_i &= Z_i \\ b_i &= H_i \\ d_i &= H_i - 2D_i + H_{i+1} \\ -c_i &= H_i - D_i + d_i \end{aligned}$$

where:

$$D_i = Z_{i+1} - Z_i, \text{ and}$$

$$H_{i+1} = 2D_i + 1D_i/(D_{i+1} + D_i) = 1/((1/2D_{i+1}) + (1/2D_i)) \quad ; D_{i+1} > 0$$
$$\phantom{H_{i+1} =} 0 \quad ; D_{i+1}D_i \leq 0.$$

* * * * *